United States Patent

[11] 3,613,551

[72] Inventor James L. Reimers
San Jose, Calif.
[21] Appl. No. 787,647
[22] Filed Dec. 30, 1968
[45] Patented Oct. 19, 1971
[73] Assignee FMC Corporation
San Jose, Calif.

[54] HEAT TREATMENT APPARATUS
20 Claims, 13 Drawing Figs.
[52] U.S. Cl. .................................................. 99/360, 259/59
[51] Int. Cl. .................................................. A23l 3/04
[50] Field of Search ........................................ 99/365, 359, 360, 361, 362, 364, 365

[56] References Cited
UNITED STATES PATENTS
1,491,958  4/1924  Logan .......................... 99/365
1,570,235  1/1926  Fooks .......................... 99/364

Primary Examiner—Robert W. Jenkins
Attorneys—F. W. Anderson and C. E. Tripp

ABSTRACT: Food-processing apparatus for cooking rows of filled containers within a cylindrical pressure housing and for supporting the containers in elongated carries of an endless processing conveyor. The conveyor is trained around a multiplicity of drive sprockets near the upper portion of the housing and is draped therefrom and guided along a plurality of looped paths below the drive sprockets as well as along an arcuate path above the sprockets to more fully utilize the holding capacity of the housing. The plurality of drive sprockets are arranged to cause a plurality of direction changes and to permit the conveyor to be driven at high speeds during processing thereby agitating the contents of the containers to affect more efficient heat transfer. Additional agitation may be imparted to the containers by permitting them to project downwardly from the carriers against curved retaining plates during a portion of their travel through the cooker. The cooker also includes an improved feed and discharge mechanism for feeding rows of containers into and discharging rows of containers from the housing of the pressure cooker through one end thereof.

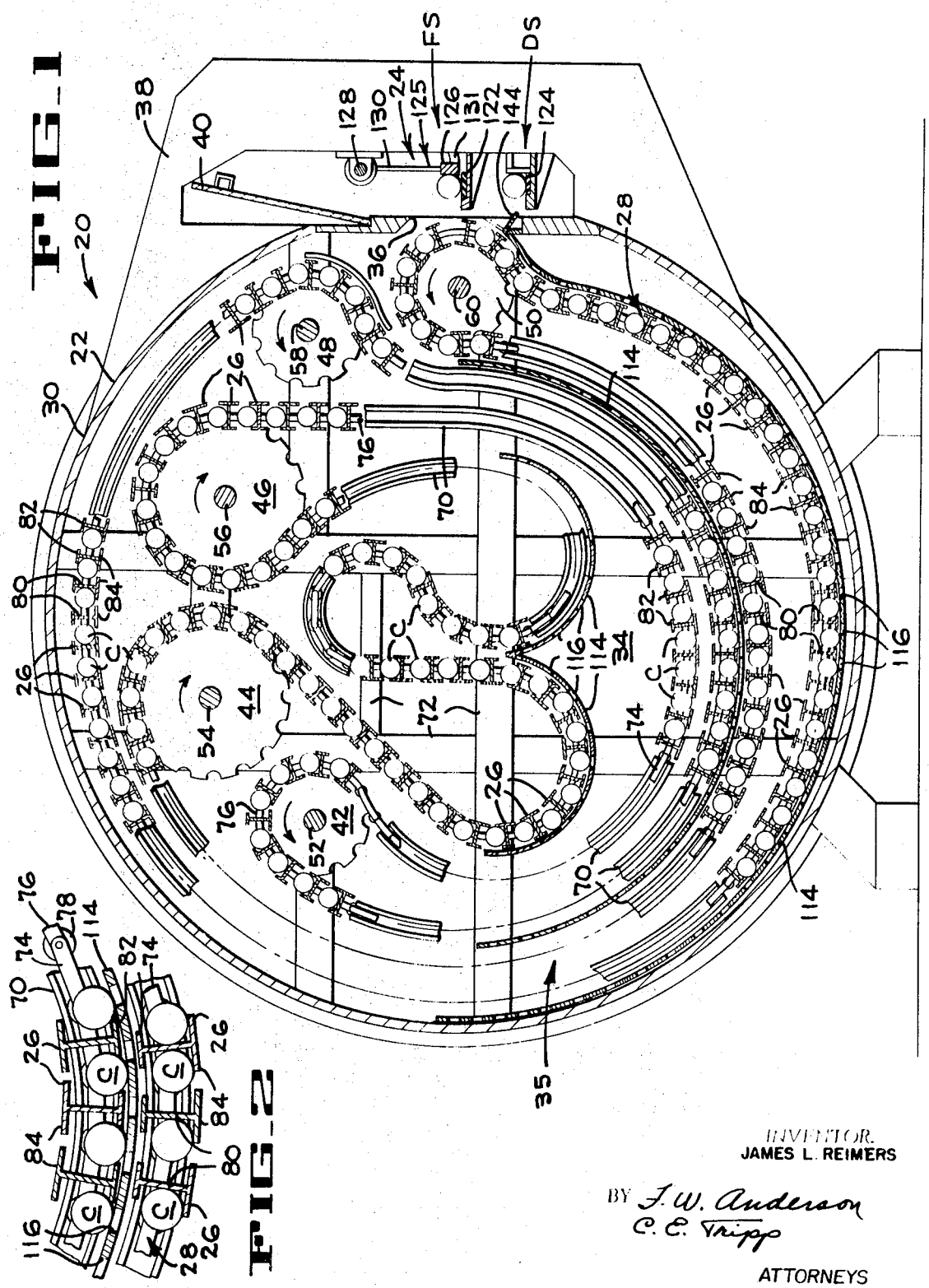

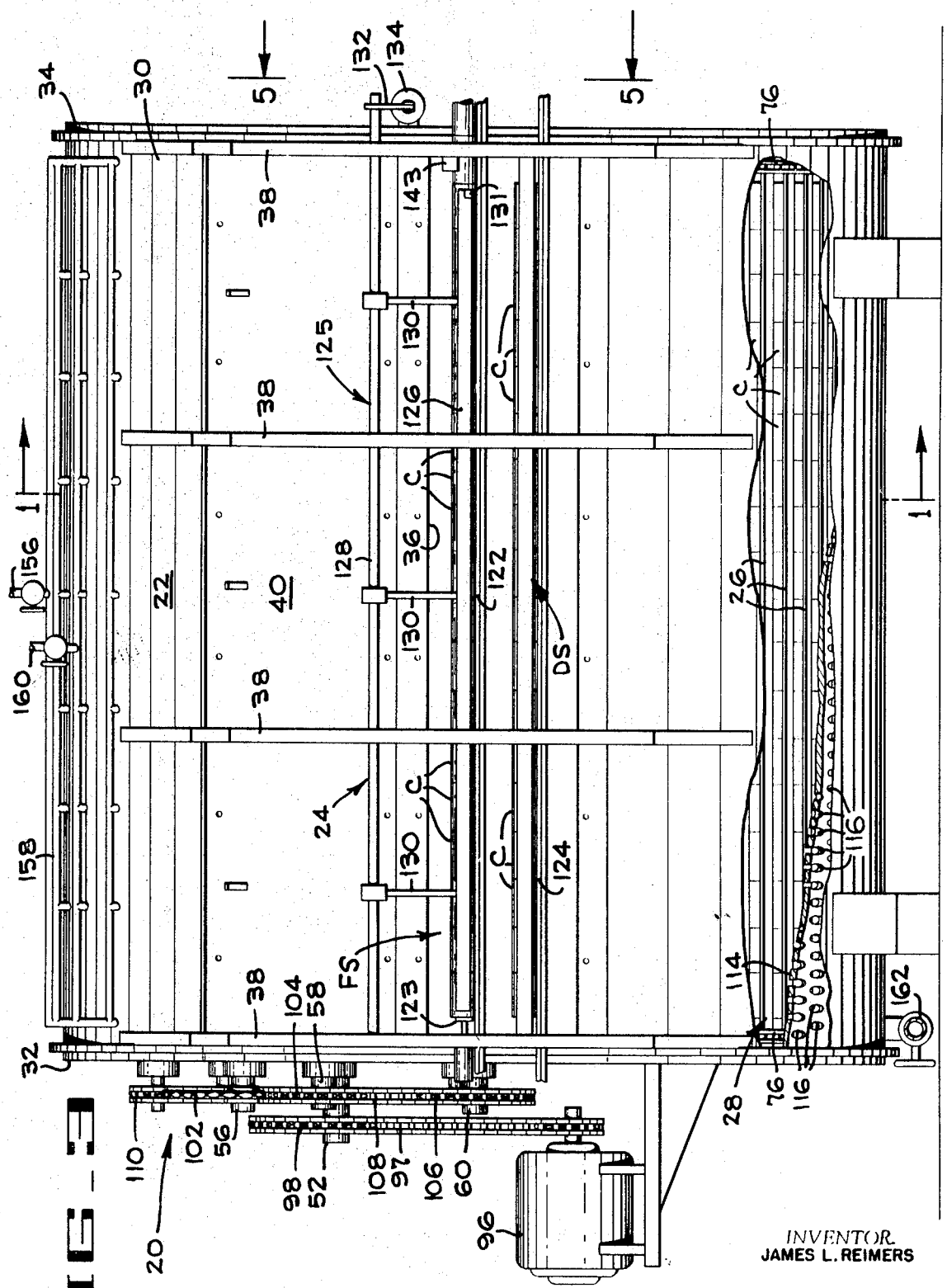

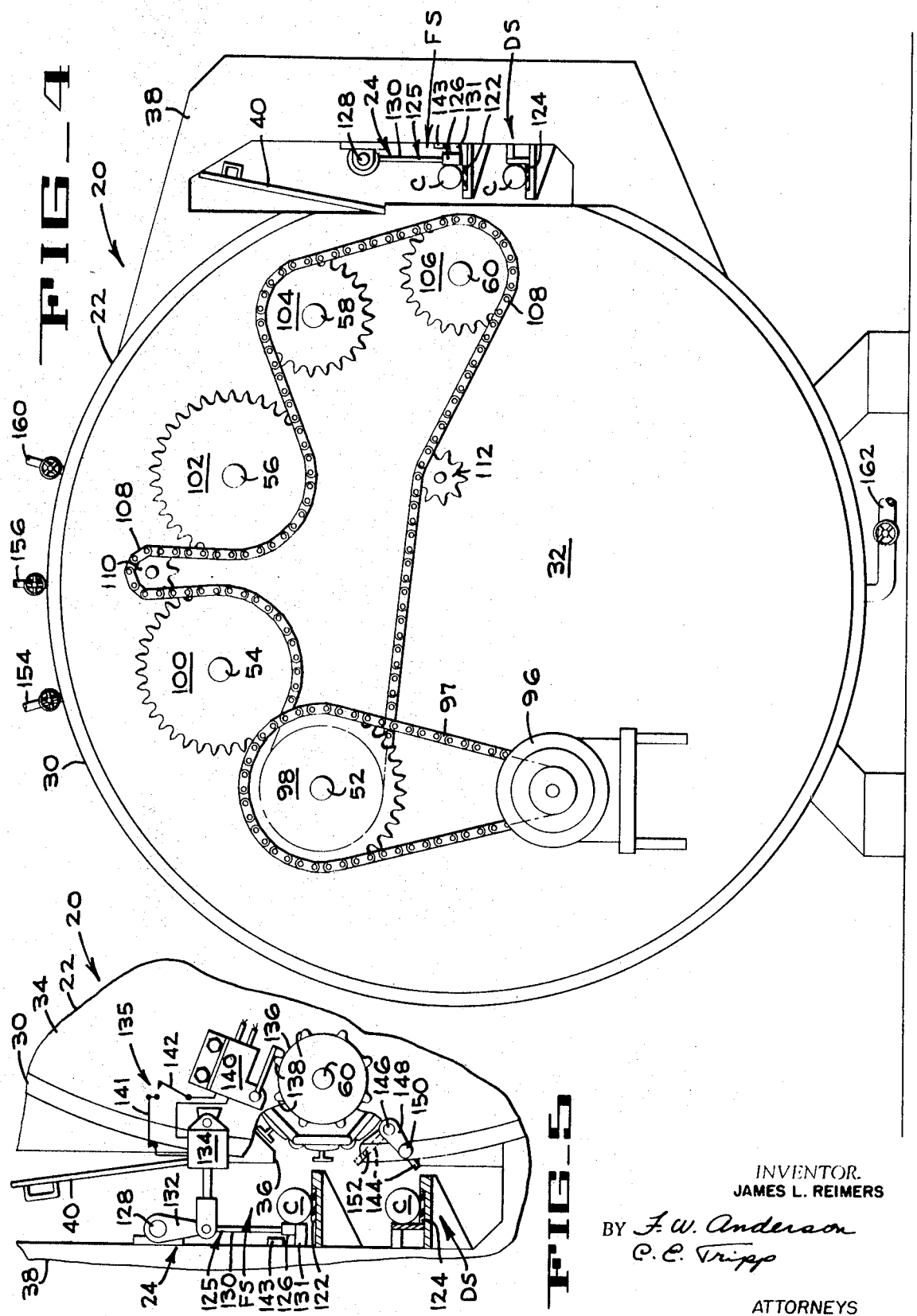

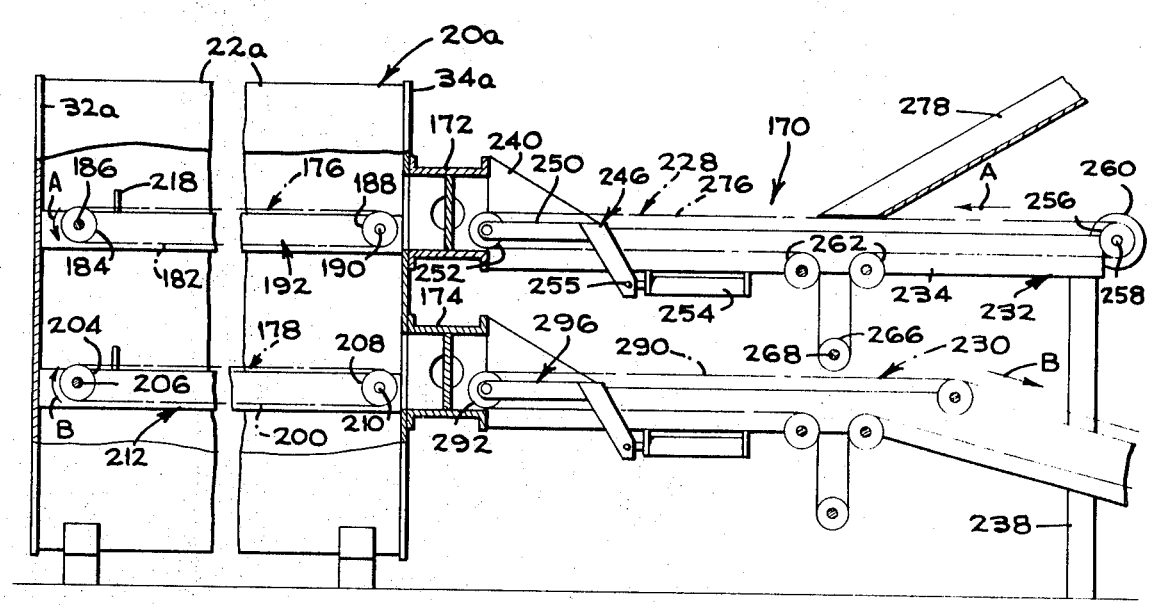
FIG_6
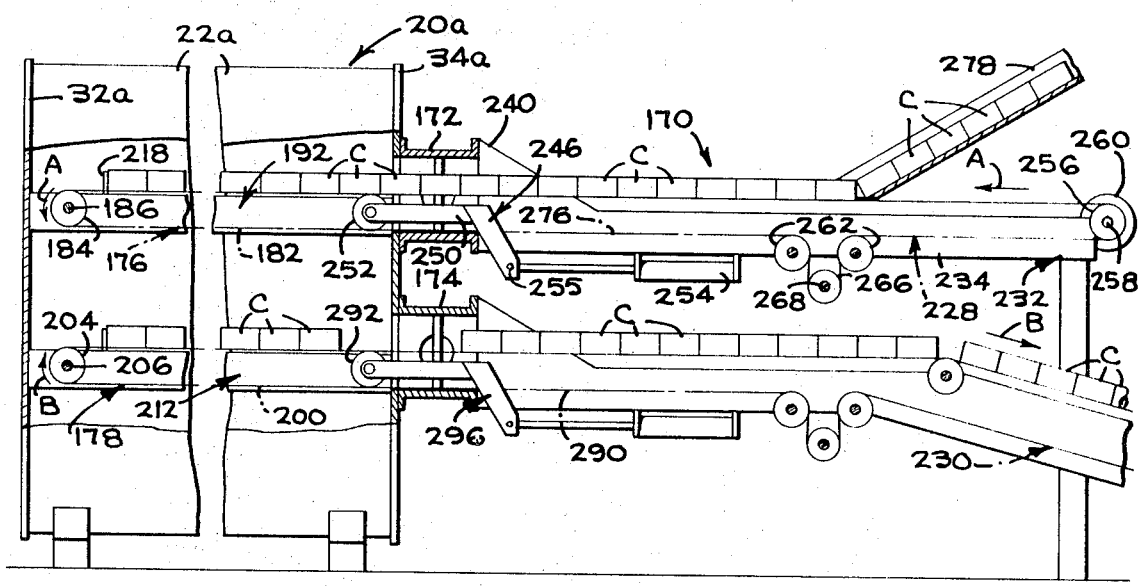
FIG_7

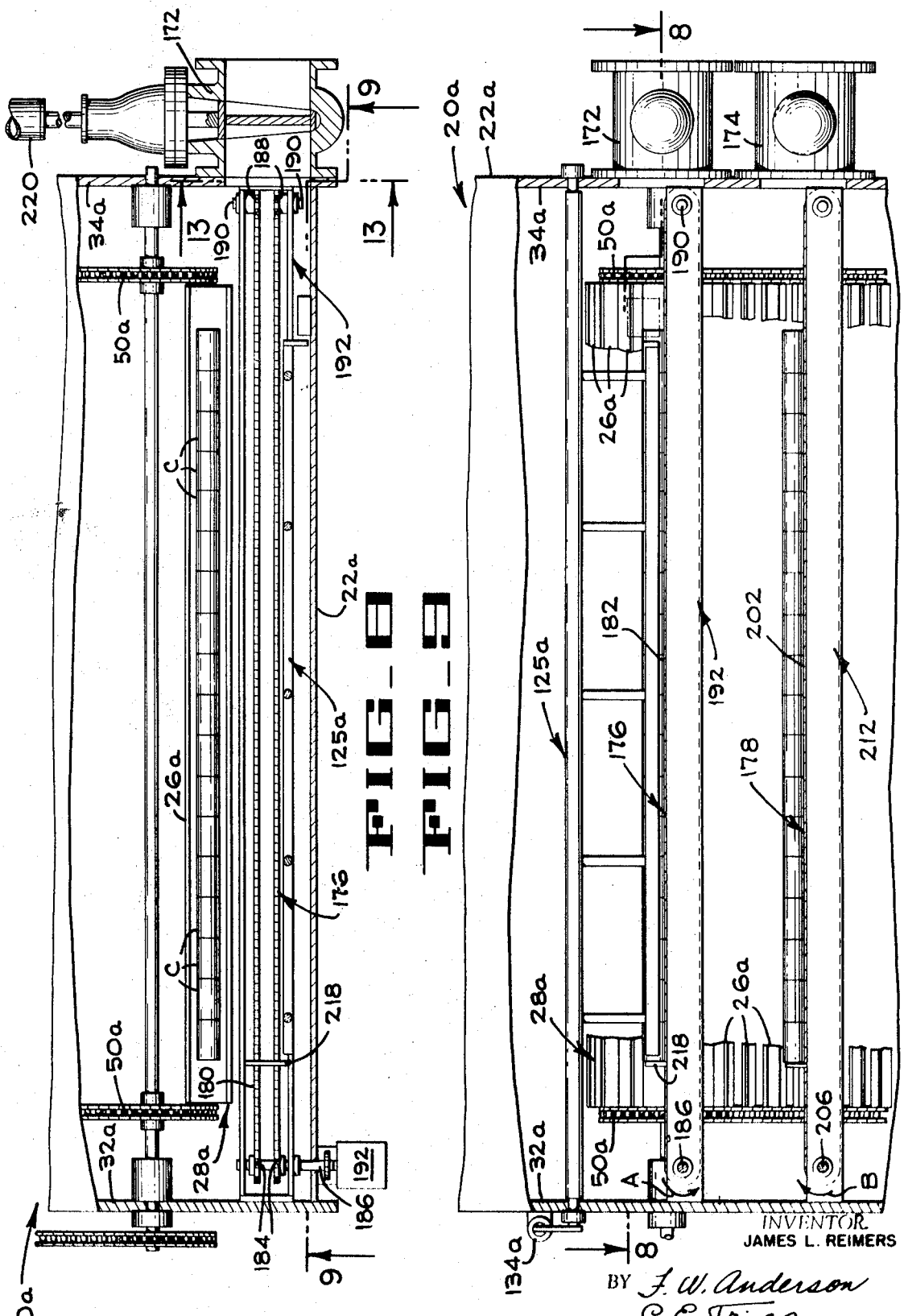

INVENTOR.
JAMES L. REIMERS
BY F. W. Anderson
C. E. Tripp
ATTORNEYS

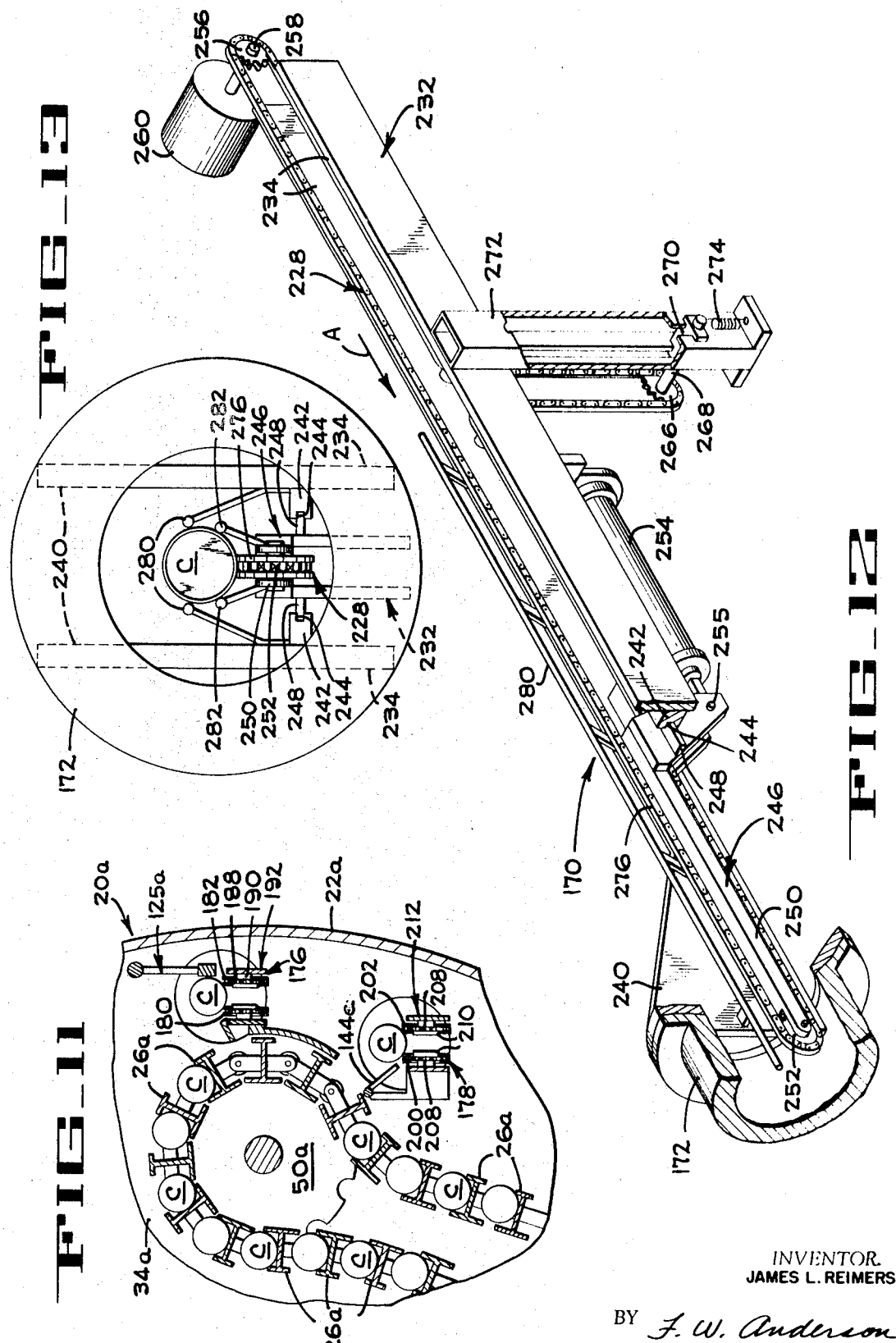

3,613,551

HEAT TREATMENT APPARATUS

CROSS-REFERENCE TO RELATED APPLICATION

The heat treatment apparatus of the present invention is somewhat similar to the apparatus disclosed in my copending application Ser. No. 660,281, which application was filed on Aug. 14, 1967 and issued on May 5, 1970 as U.S. Pat. No. 3,510,310.

BACKGROUND OF THE INVENTION

1. Field of the Invention

This invention pertains to the cooker art and more particularly relates to an agitating cooker and an improved feed and discharge mechanism adapted to handle rows of containers within a cylindrical pressure housing.

2. Description of Prior Art

Several types of heat treatment apparatus have been used for cooking and cooling food products hermetically sealed in containers such as cans or glass jars. One such apparatus is the well-known hydrostatic cooker which may be of the type disclosed in U.S. Pat. No. 3,286,619 which issued to Lee on Nov. 22, 1966. These cookers include conveyors which advance rows of containers through water legs which may be on the order of 60 feet tall, and accordingly, these cookers are quite expensive. Also, the product being cooked in hydrostatic cookers are subjected to very little agitation.

Another type of cooker is the reel and spiral type such as that disclosed in U.S. Pat. No. 2,536,116 which issued to Paul C. Wilbur on Jan. 2, 1951. This type of cooker has the disadvantage of requiring that the containers be fed to and discharged from the cooker one at a time, and also has the disadvantage of requiring that the containers be advanced spirally through the cooker from one end to the other thus subjecting the containers to considerable frictional wear. The holding capacity of these cookers is also quite limited since the containers are retained in a single layer near the periphery of the cooker housing. Container agitation in this type of cooker is also quite limited.

Another type of cooker heretofore used quite extensively by small canners is the batch type retort cooker. In this type of cooker very little control is exercised over the containers being processed, and accordingly, many dents occur if cans are being processed, and excessive breakage occurs if the containers are glass jars. When containers are being processed by retort cookers, the containers receive little if any agitation.

SUMMARY OF THE INVENTION

The heat treatment apparatus of the present invention is similar to that disclosed in my aforementioned copending application and is specifically arranged to subject the containers to a high amount of agitation. The apparatus includes a cylindrical housing having a cylindrical wall and closed ends and having elongated row-accommodating carriers mounted on an endless processing conveyor. The conveyor is trained around a plurality of drive sprockets within the housing in a manner which more completely utilizes the holding capacity within the housing and which drivingly supports the conveyor at several locations so that the conveyor may be rapidly driven, and so that the direction of movement of the containers will be frequently and abruptly changed thus imparting a high degree of agitation to the contents of the containers. A second embodiment of the apparatus also discloses an improved feed and discharge system adapted to move the containers into one end of the housing rather than through a slot in the cylindrical wall thereof thus eliminating the necessity of providing substantial reinforcement for the cylindrical wall to withstand high cooking pressures within the apparatus during processing.

BRIEF DESCRIPTION OF THE DRAWINGS

FIG. 1 is a diagrammatic vertical central section taken along lines 1—1 of FIG. 3 through a first embodiment of the heat treatment apparatus of the present invention.

FIG. 2 is an enlarged elevation of a fragment of two rows of the processing conveyor illustrating several carriers of the processing conveyor and the tracks for guiding the same.

FIG. 3 is a diagrammatic side elevation of the apparatus of FIG. 1.

FIG. 4 is a diagrammatic end elevation of the apparatus illustrating the drive mechanism for the processing conveyor.

FIG. 5 is an enlarged fragmentary elevation looking in the direction of arrows 5—5 of FIG. 3 illustrating the control system for the feed mechanism.

FIG. 6 is a diagrammatic side elevation of a second embodiment of the invention illustrating a heat treatment apparatus associated with an end feed and discharge mechanism, the end feed and discharge mechanism being shown in an inactive position.

FIG. 7 is a diagrammatic side elevation similar to FIG. 6 but showing the end feed and discharge mechanism in an active feed and discharge position.

FIG. 8 is an enlarged plan of a portion of the heat treatment apparatus of FIG. 6, the feed station being illustrated in section taken along lines 8—8 of FIG. 9, only one carrier of the processing conveyor being shown.

FIG. 9 is a section taken substantially along lines 9—9 of FIG. 8.

FIG. 11 is an enlarged vertical transverse section taken through the feed and discharge station of the apparatus of FIG. 6.

FIG. 12 is a diagrammatic perspective of the infeed conveyor, certain parts being removed and other parts being shown in section.

FIG. 13 is a section taken substantially along lines 13—13 of FIG. 8 illustrating the guide rails associated with the infeed conveyor.

DESCRIPTION OF PREFERRED EMBODIMENT

Figure 10:
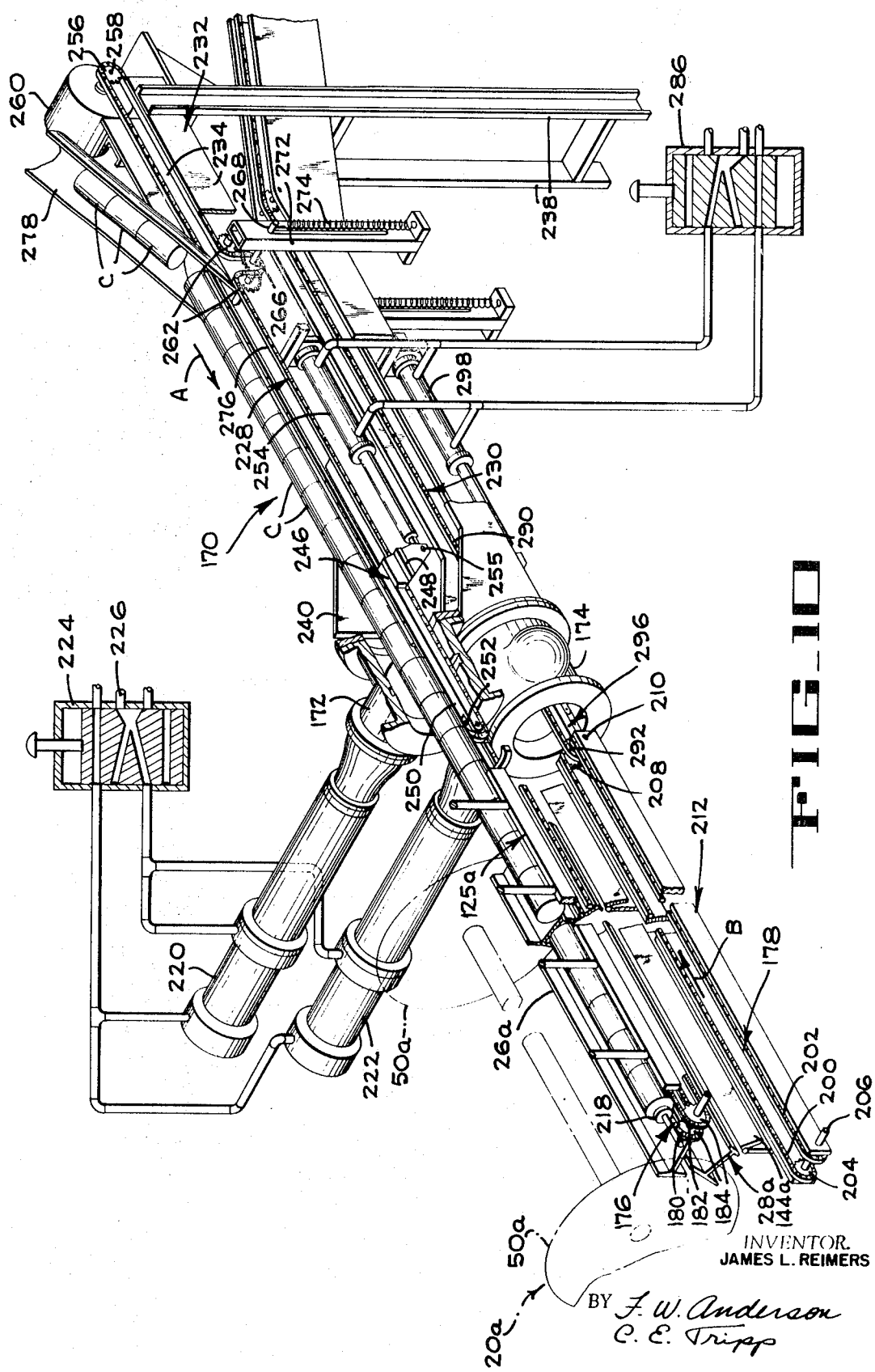
FIG. 10 is a diagrammatic perspective of the end feed and discharge mechanism shown in the active position with certain parts being cut away and other parts being shown in section or in phantom.

A first embodiment of the heat treatment apparatus 20 (FIGS. 1-5) of the present invention discloses a batch process wherein the containers are fed into and discharged from the apparatus from one side thereof. The apparatus includes a cylindrical housing 22 having a feed and discharge mechanism 24 at a feed station FS and discharge station DS for deflecting rows of containers C to be processed transversely into elongated carriers 26 of a looped processing conveyor 28 and for receiving processed containers from the carriers 26. During the transverse or side feeding and discharging operation the conveyor is driven at the relatively slow rate of about 20 rows per minute which corresponds to a conveyor speed of about 5 feet per minute. After the containers C have been loaded into the carriers 26, the housing 22 is sealed in pressure tight relationship and a heat treatment medium at high temperature and pressure is first directed into the housing to cook the product, and thereafter high-pressure air and cooling water is directed into the housing to cool the contents of the containers. During the cooking and cooling operation the conveyor 28 is driven at a high rate of speed, for example, at about 300 feet per minute, thereby agitating the contents of the containers to improve the rate of heat transfer. After the containers have been cooked and cooled, the housing is opened and the conveyor 28 is again driven at its slow rate to discharge about 20 rows of processed containers per minute from the carriers of the processing conveyor, and to simultaneously receive other rows of containers to be processed.

More particularly, the apparatus 20 comprises the housing 22 which includes a cylindrical shell 30 with its ends sealed in pressure-tight engagement by end walls 32 and 34 to define a processing chamber 35. An elongated slot 36 is formed in the cylindrical shell to allow rows of containers to be moved transversely therethrough during the feeding and discharging operations. A plurality of reinforcing ribs 38 are secured to the shell adjacent the slot 36 to reinforce the area adjacent the slot to prevent deflection thereof when subjected to high cooking pressures. The housing is closed during the cooking and cooling operation by a removable gate 40 which is bolted in pressure-tight engagement over the slot 36.

As best shown in FIG. 1, the processing conveyor 28 is supported by and trained around five pair of driven sprockets 42, 44, 46, 48 and 50 which sprockets are keyed to drive shafts 52, 54, 56, 58 and 60, respectively, journaled in and sealed to the end walls 32 and 34. In addition to the above-referred-to pairs of sprockets, the conveyor 28 is accurately guided along its tortuous path within the housing by channel tracks 70 which are secured to frames 72 within the housing 22 adjacent each end wall 32 and 34. All of the sprockets are disposed within the upper portion of said chamber and the pathway of the conveyor and carriers loops downwardly into the lower portion of the chamber between each sprocket over which the pathway passes. Between sprockets 44 and 46 the chains also twist around the centermost portion of the chamber in addition to looping downwardly.

As is well known in the art, the carriers 26 (FIG. 2) of the processing conveyor 28 are of the articulating I-beam type and are mounted between and connected to opposed links 74 of two spaced parallel chains 76, which chains are trained around the pairs of sprockets and include rollers 78 that are guided along the tracks 70. Each carrier includes an elongated web 80 having a narrow flange 82 on one edge and a wide flange 84 on the other edge. The sprockets 50 (FIG. 1) adjacent the slot 36 in the housing are small in diameter causing adjacent carriers to deflect a sufficient amount to open the carriers permitting rows of containers to be processed to be deflected into the carriers and permitting processed containers to gravitate therefrom.

The processing conveyor 28 is driven by a variable speed motor-transmission unit 96 (FIG. 4) which is connected by a chain drive 97 to the shaft 52. Shafts 52, 54, 56, 58 and 60 have drive sprockets 98, 100, 102, 104 and 106, respectively, keyed thereon. A drive chain 108 is trained around the sprockets 98, 100, 102, 104 and 106, and around idler sprockets 110 and 112. Thus, the conveyor 28 (FIG. 1) is driven by the five pairs of sprockets 42, 44, 46, 48 and 50 thereby distributing the driving load to spaced points on the conveyor 28. In this regard, the arrangement of the pairs of drive sprockets 42, 44, 46, 48 and 50 is such that each of the pairs of drive sprockets either pushes or pulls approximately 20 percent of the total length of the processing conveyor, which conveyor length is about 120 feet when the conveyor is fitted within a housing that is about 10 feet in diameter. It will further be noted that all of the pairs of driven sprockets, except for the sprockets 48, (FIG. 1) are pulling the conveyor 28 when the conveyor is moving upwardly and are pushing the conveyor when the conveyor is moving downwardly. Although sprockets 48 are pushing a short section of the processing conveyor upwardly against the forces of gravity, it will be noted that a much larger portion of that run of the conveyor gravitationally pulls the conveyor downwardly thereby keeping the conveyor taut. This minimizes friction forces which the several pairs of sprockets must overcome.

Since the pairs of drive sprockets are arranged so as to engage and drive the processing conveyor 28 at substantially evenly spaced intervals, the conveyor can be rapidly driven during processing, for example, at the rate of about 300 feet per minute. This rapid speed subjects the containers to a high degree of agitation since the containers are alternately subjected to clockwise and counterclockwise rotation as indicated by the arrows in FIG. 1.

In order to increase the amount of agitation to which the rows of containers are subjected while being processed, curved guide plates 114 are mounted below those runs of the conveyor having the narrow flanges 82 lowermost. The guide plates 114 are provided with a plurality of spaced elongated slots 116 that extend parallel to the direction of movement of the conveyor and permit cooling liquid to flow therethrough. It is, of course, understood that the agitation of the food product within the containers increases the rate of heat transfer through the product during both the cooking and the cooling operations.

As best shown in FIG. 5, the feed and discharge mechanism 24 is disposed immediately adjacent the elongated slot 36 in the shell 30 and is operated only after the gate 40 has first been removed from the slot and is placed in the inactive position shown in FIG. 5. The feed and discharge mechanism 24 comprises a continuously driven feed conveyor 122 which advances rows of containers C to be processed against a stop 123 (FIG. 3) into position to be deflected transversely of the length of the rows through the elongated slot 36 and into the carriers 26, and a continuously driven discharge conveyor 124 for gravitationally receiving rows of processed containers which move transversely from the carriers through the slot 36.

In order to deflect rows of containers into the carriers 26, a feed transfer device 125 of the mechanism 24 is provided and includes a transfer bar 126 that is connected to a shaft 128 by arms 130. An arcuate plate 131 secured to one end of the bar 126 precludes entry of containers into the feed station FS when the bar is in its active container-deflecting position. The shaft 128 is pivotally mounted on the reinforcing ribs 38 and has an arm 132 keyed thereto which is pivotally connected to the movable element of a power unit 134, such as a solenoid, that is anchored to the housing 22. The solenoid is included in a control circuit 135 and is energized upon detection of a full row of containers in loading position at the feed station and upon detection of a carrier being in position to receive a row of containers. In this regard, a cam 136 is keyed to the shaft 60 and has a plurality of lobes 138 on its periphery which close the contacts of a switch 140 to energize the solenoid 134 through the closed contacts of a manually operated switch 141 each time a carrier 26 is in position to receive a row of containers C and through closed contacts of a full row switch 142 which closes only when a full row of containers are at the feed station FS. Energization of the solenoid causes the transfer bar 126 to sweep across the feed conveyor 122 and push the row of containers into carriers in a manner well known in the art. It will be understood that the manual switch 141 is opened during the cooking and cooling operation thereby rendering the solenoid inactive.

The full row switch 142 is closed only when a sensing head 143 detects the presence of stationary containers adjacent thereto thus indicating that a full row of containers has been formed on the feed conveyor 122 in position to be deflected into the associated carrier 26. The sensing head 143 may be a Peco Model G, Can-Flo Control as manufactured by Peco Corporation, 111 Artega Avenue, Mountain View, California.

In order to permit gravitational discharge of the rows of containers from the carriers 26 after they have been cooked and cooled, an elongated bridge plate 144 (FIGS. 1 and 5) is pivoted from the dotted line position to the full line position as illustrated in FIG. 5. The bridge plate 144 is mounted on a pivot shaft 146 journaled in the end walls of the housing 22 and has an actuating arm 148 keyed thereto. The arm 148 is provided with a spring-loaded locking pin 150 which is selectively positioned in either of two holes 152 (only one being shown) in the end wall 34 to selectively lock the bridge plate 144 in either the dotted or the full line positions (FIG. 5).

As diagrammatically illustrated in FIGS. 3 and 4, steam or a steam-air mixture is introduced into the housing 22 through a valved conduit 154, cooling water is introduced into the housing through a valved conduit 156 connected to a spray system 158 (FIG. 3) and high-pressure air is directed into the housing through a valved conduit 160 during at least the initial portion of the cooling cycle to prevent injury to the containers which might occur if the pressure acting on the external surfaces of the containers was suddenly reduced to atmospheric pressure. A valved drain conduit 162 is provided in the lower portion of the housing 22 to drain cooling water and condensate therefrom.

In the operation of the first embodiment of the heat treatment apparatus 20 of the present invention it will be assumed that the product being processed is dogfood hermetically sealed in 300 × 407 cans, i.e., cans that are 3 inches in diameter and 4 7/16 inches in length. The gate 40 is removed from the elongated slot 36 (FIG. 1) and the motor-transmission unit 96 is energized to drive the processing conveyor 28 at the rate of about 20 rows per minute. The bridge plate 144 is pivoted to its downwardly inclined position illustrated in solid lines in FIG. 5 so that a previously processed batch of containers in the apparatus 20 will gravitate transversely therefrom one row at a time and be removed from the apparatus 20 by the continuously driven discharge conveyor 124.

The manual switch 141 of the feed and discharge mechanism 24 is closed and a batch of the containers to be processed are advanced by the continuously driven feed conveyor 122 into position to be deflected transversely, in rows of about 18 containers each, into the housing 22 and into the associated carriers 26. Each time the movement of the containers on the feed conveyor 122 is stopped by the container stop 123 (FIG. 3), the sensing head 143 closes switch 142 (FIG. 5). Each time the switch 142 is closed and a carrier 26 is in position to receive a row of containers, one of the cam lobes 138 (FIG. 5) of cam 136 closes the switch 140 thereby energizing solenoid 134 causing a row of containers to be swept transversely from the feed conveyor 122 through the slot 36 and into the particular carrier 26 that is in the feed position. After substantially all of the carriers of the processing conveyor 28 have been filled, the manual switch 141 is opened thereby deactivating the solenoid 134 of the feed and discharge mechanism 24. The bridge plate 144 is locked in its upwardly inclined position (FIG. 1) to retain the containers in the carriers 26 as the carriers move past the slot 36, and the gate 40 is then bolted in fluid-tight relationship over the elongated slot 36.

The motor-transmission unit 96 is then actuated to drive the conveyor at the rate of about 300 feet per minute. The cooking medium, which is preferably steam at about 250° F. and 15.1 p.s.i.g., is then directed into the housing 22 through valved conduit 154 and is maintained at this temperature and pressure for about 60 minutes. During this time the containers are subjected to a considerable amount of agitation since they are alternately and abruptly swung counterclockwise and clockwise as indicated by the arrows in FIG. 1 around the plurality of relatively sharp curves defined by the several sets of sprockets and guide tracks within the housing 22. The containers of dog food are additionally agitated since they project out of the carriers 26 and roll along the aforementioned guide plates 114.

After the containers have been subjected to the cooking medium for about 60 minutes, high-pressure air at about 15.1 p.s.i.g. is directed into the housing 22 through conduit 160, and cooling water at about 75° F. is sprayed into the housing from the conduit 156 and spray system 158 to cool the contents of the containers. After the contents have been cooled sufficiently to reduce the pressure within the containers to a safe level, the valved air supply conduit 160 is closed. It will be understood that the conveyor is driven at the high speed of about 300 containers per minute during both the cooking and cooling operations, and that the cooling operation, when processing dog food, is completed within about 35 minutes. During this cooling operation water is drained from the housing 22 through valved conduit 162.

After the cooling operation has been completed, the motor-transmission unit 96 is deenergized, gate 40 is removed from the elongated slot 36, and the bridge plate 144 is locked in its downwardly inclined position. The motor-transmission unit 96 is then reenergized and adjusted to drive the processing conveyor 28 at its slow speed of about 20 rows per minute. During this interval, the rows of processed containers are discharged from the processing conveyor 28 onto the discharge conveyor 124, and simultaneously therewith, rows of containers to be processed are fed into the carriers 26 to again load the carriers with containers to be processed.

Although the above operation is directed to the processing of dogfood hermetically sealed within cans, it will be understood that other food products such as milk, vegetables, fish, and fruit may be processed by the heat treatment apparatus 20. It will also be understood that other types of containers may be used such as glass jars, fiber containers, and flexible containers or pouches. It will also be understood that other heat treatment mediums may be used. For example, when processing products in glass jars it may be desirable to use hot water subjected to an overriding air pressure when cooking, and cold water subjected to an overriding air pressure when cooling.

The second embodiment of the invention as illustrated in FIGS. 6 to 13 provides a heat treatment apparatus 20a which is substantially the same as the apparatus 20 except that the containers are fed into the cylindrical housing 22a from one end thereof rather than through an elongated slot in the side as was done in the first embodiment of the invention.

Since the heat treatment apparatus 20a of the second embodiment of the invention includes a processing conveyor 28a (FIGS. 8, 9 and 11), a drive system for the processing conveyor, a transfer device 125a and a control circuit therefor, and a conduit system for introducing heat treatment mediums into the apparatus 20a that are substantially the same as those disclosed in the apparatus 20, the description of such structure will not be repeated. Parts of the heat treatment apparatus 20a that are similar to the parts of the apparatus 20 will be assigned the same numerals followed by the letter a.

As indicated above, the primary distinction between the two embodiments of the present invention is that the apparatus 20 (FIG. 1) has rows of containers C fed into and discharged transversely from the apparatus through the slot 36 in the housing 22, whereas the apparatus 20a is provided with an end feed and discharge mechanism 170 (FIGS. 6, 7, 10 and 12) which feeds and discharges rows of containers C through gate valves 172 and 174, respectively, secured to the end plate 34a of the housing 22a. It will be understood that the housing 22a is slightly larger in diameter than the housing 22 (FIG. 1) so as to accommodate an endless feed conveyor 176 (FIGS. 6-9 and 11) and a discharge conveyor 178 of the mechanism 170 within the housing 22a immediately adjacent the carriers 26a of the feed conveyor 28a as they move around the feed sprockets 50a as best illustrated in FIG. 11.

The feed conveyor 176 comprises a pair of spaced endless chains 180 and 182 which are trained around drive sprockets 184 (FIG. 8) keyed to a shaft 186, and around a pair of driven sprockets 188 each of which is keyed on a stub shaft 190. The shaft 186 is journaled in an elongated frame 192 secured to the end walls 32a and 34a, while each stub shaft 190 is journaled to the adjacent portion of the frame 192 so that a space occurs between the sprockets 188. The drive shaft 186 projects through a stuffing box in the housing wall 22a and is continuously driven in the direction of the arrows A by a motor 192 during the feeding and discharging operation. Guide rails (not shown) are secured to the frame 192 to maintain the upper run of the feed conveyor 176 horizontal.

Similarly, the discharge conveyor 178 comprises a pair of endless chains 200 and 202 which are trained around spaced drive sprockets 204 keyed to a shaft 206, and around a pair of spaced driven sprockets 208 each of which is keyed to a stub shaft 210. The shaft 206 is journaled in an elongated frame 212 secured to the end walls 32a and 34a, while each stub shaft 210 is journaled in an adjacent portion of the frame 212 so that a space exists between the sprockets 208. The drive shaft 206 projects through a stuffing box in the housing wall 22a and is continuously driven in the direction indicated by the arrow B by a motor (not shown) during the feeding and discharging operation. Guide rails (not shown) are secured to the frame 212 and maintain the upper run of the discharge conveyor 178 horizontal.

After a complete row of containers have been moved by the feed conveyor 176 in position to be deflected into the adjacent carrier 26a of the conveyor 28a with the foremost container resting against a stop 218, the transfer device 125a is actuated in timed relation with the movement of the conveyor by a power unit 134a (FIG. 9) of a control circuit which is identical to control circuit 135 (FIG. 5) to deflect the row of containers into the particular carrier 26a at the feed station.

During the feed and discharge operation the gate valves 172 and 174 (FIGS. 6–10) are opened by pneumatic cylinders 220 and 222 (FIG. 8) upon actuation of a manual valve 224 connected to a high pressure source of air by conduit 226.

In order to positively transfer rows of containers through the feed valve 172 and onto the feed conveyor 176, and to positively transfer rows of processed containers from the discharge conveyor 178 and through the discharge gate valve 174, the end feed and discharge mechanism 170 includes an input conveyor 228 (FIGS. 6, 7, 10 and 12) and an output conveyor 230 (FIGS. 6, 7 and 10).

The input conveyor 228 (FIGS. 6, 7, 10, 12 and 13) is mounted on a frame 232 that includes spaced longitudinally extending beams 234 supported at one end by legs 238 and at the other end by webs 240 that are secured to the feed valve 172. A pair of slide bars 242 (FIGS. 12 and 13) having elongated parallel slots 244 therein are secured to the beams 234. A carriage 246 includes a pair of plates 248 which are slidably received in the slots 244, and also includes an elongated horizontal arm 250 which has its free end slotted so as to rotatably receive a small diameter idler sprocket 252. A pneumatic cylinder 254 has one end anchored to the frame 232 and the other end connected to the carriage 246 by a pin 255. A drive sprocket 256 (FIG. 12) is keyed to a shaft 258 journaled in the frame 232 and coupled to a motor 260. Two spaced idler sprockets 262 are journaled on shafts secured to the spaced beams 234 near their midpoint, and a movable takeup sprocket 266 is journaled on a shaft 268 that is carried by a slide block 270. The slide block 270 is slidably received within a slotted vertical tube 272 and is urged downwardly to the position shown in FIG. 12 by a spring 274. An endless chain 276 is trained around the sprockets 252, 256, 262 and 266 and its upper run is supported in a horizontal plane by a guide rail (not shown). The upper run of the chain 276 is continuously driven in the direction indicated by arrows A by the motor 260 during the feed and discharge operation. Containers to be processed are directed onto the conveyor 228 by a gravity chute 278 (FIG. 10) and are retained on the single chain 276 by guide rails 280 (FIG. 13) secured to the beams 234 and disposed on both sides of the chain 276. In addition to the rails 280, short movable guide rails 282 are positioned on opposite sides of the chain 276 and are mounted on the carriage arm 250.

When it is desired to feed containers through the gate valve 172 and into the housing 22a (FIGS. 6 and 7), the gate valve 172 is opened by actuation of the pneumatic valve 224 (FIG. 10) and a manual pneumatic valve 286 is actuated to direct high pressure air into the left end of the pneumatic cylinder 254 to move the free end of the carriage 246 through the gate valve 172 as indicated in FIGS. 7 and 10 so that the sprocket 252 is disposed between the spaced sprockets 188 (FIG. 8) of a feed conveyor 176. Thus, the input conveyor 228 and feed conveyor 176 cooperate to move containers into the feed station in position to be deflected into the carriers 26a of the conveyor 28a. It will be noted that when the input conveyor 228 is in its extended position shown in FIGS. 7 and 10, that the takeup sprocket 266 is moved upwardly against the urging of spring 274, and that the guide rails 282 (FIG. 13) are positioned so as to guide the containers through the gate valve 172 and onto the two spaced chains 180 and 182 of the feed conveyor 176.

The output conveyor 230 (FIGS. 6, 7 and 10) is quite similar to the input conveyor 228 and, accordingly, will not be described in detail. It will suffice to say that the output conveyor 230 includes an endless chain 290 trained around an idler sprocket 292 journaled on the free end of an elongated arm of a carriage 296. The chain 290 is also trained around idler sprockets and takeup sprockets similar to those of the input conveyor 228, and is driven in the direction indicated by the arrows B in FIGS. 6, 7 and 10 by a motor (not shown).

During the feed and discharge operation the discharge gate valve 174 is opened in response to activation of the manual valve 224 which energizes pneumatic cylinder 222. The carriage sprocket 292 is then moved through the open gate valve 174 into position between the sprockets 208 (FIG. 10) of the discharge conveyor 178 in response to actuation of the pneumatic valve 286 which energizes a pneumatic cylinder 298 that is connected between the carriage 296 and frame 232. Thus, rows of containers discharged from the carriers 26a of the processing conveyor 28a over the bridge plate 144a and onto the discharge conveyor 178 will be advanced by the discharge conveyor 178 and the output conveyor 230 out of the housing 22a and through the open discharge valve 174 to other container-handling equipment not shown.

From the foregoing description it will be apparent that the batch-type heat treatment apparatus of the present invention includes an endless processing conveyor disposed within a cylindrical pressure housing and guided along a tortuous path, which path is specifically arranged to impart a high degree of agitation to the rows of containers when driven at high speeds. The processing conveyor is driven at high speeds during processing, and at a slow speed during the feed and discharge operation by a plurality of spaced pairs of sprockets within the cylindrical housing. The sprockets are arranged to alternately and abruptly change the direction of movement of the containers thereby agitating the contents of the containers.

In accordance with the first embodiment of the invention the rows of containers are moved transversely through a slot in the cylindrical wall of the heat treatment apparatus when rows of containers are fed into or discharged from the housing. In accordance with the second embodiment of the invention, an end feed and discharge system is provided for reliably moving containers into and discharging containers from one end of the housing of the heat treatment apparatus.

Although the best mode contemplated for carrying out the present invention has been herein shown and described, the subject matter which is regarded as the invention is set forth in the appended claims.

1. A heat treatment apparatus for processing products sealed in containers comprising, housing means defining a processing chamber including a shell and end walls, an endless looped processing conveyor in said chamber, a plurality of spaced articulating carriers on said conveyor for accommodating rows of containers, guide means in said chamber for guiding said conveyor around a tortuous path which includes a plurality of substantially semicylindrical looped portions, a plurality of pairs of sprockets included in said guide means, means for driving said plurality of pairs of sprockets at high speeds during a processing operation for agitating the contents of the containers and at a slow speed during a feeding and discharging operation, means for feeding rows of containers into said chamber and carriers and for discharging rows of containers from said carriers and chamber, and means for directing a heat treatment medium into said housing.

2. An apparatus according to claim 1 wherein said carriers are I-beam carriers each including a web having a narrow flange on one edge and a wide flange on the other edge, and additionally comprising a curved guide plate disposed immediately adjacent a looped portion of said path in which said narrow flanges are radially outermost of said looped portion and are spaced from each other a distance sufficient to permit the rows of containers in said carriers to project outwardly therefrom and roll along said plate to further agitate the containers.

3. An apparatus according to claim 1 wherein said pairs of driven sprockets are arranged in said chamber so that each pair of sprocket drives a section of said conveyor which is substantially equal in length to the sections of the conveyor driven by the other pairs of sprockets.

4. An apparatus according to claim 3 wherein said pairs of sprockets and said guide means are arranged so that the rows of containers are alternately moved clockwise and counterclockwise around curves of relatively small radius.

5. An apparatus according to claim 1 wherein said pairs of sprockets and said guide means are arranged so that the rows of containers are alternately moved clockwise and counterclockwise around curves of relatively small radius.

6. An apparatus according to claim 1 wherein said processing conveyor is driven at the rate of about 300 feet per minute when operating at said high speed, and is driven at the rate of about 5 feet per minute when operating at said low speed.

7. A heat treatment apparatus for processing products sealed in containers comprising, housing means defining a processing chamber including a generally cylindrical shell and end walls, closure means defining at least one sealable passageway into said housing means for accommodating movement of rows of containers into and out of said chamber when open and for maintaining a superatmospheric pressure within said chamber when closed, an endless processing conveyor in said chamber, a plurality of spaced articulating carriers on said conveyor for accommodating rows of containers, guide means in said chamber for guiding said conveyor around a tortuous path which includes a plurality of substantially semicylindrical looped portions, a plurality of pairs of sprockets included in said guide means, means for driving said plurality of pairs of sprockets at high speeds during a processing operation for agitating the contents of the containers and at a slow speed during a feeding and discharging operation, means for feeding rows of containers into said chamber and carriers and for discharging rows of containers from said carriers and chamber, when said closure means is open, and means for directing a heat treatment medium into said housing.

8. An apparatus according to claim 7 wherein said heat treatment medium is steam under superatmospheric pressure.

9. An apparatus according to claim 7 wherein means are provided for directing steam under superatmospheric pressure into said chamber during a cooking portion of said processing operation, and wherein means are provided to direct cold water and high-pressure air into said chamber during a cooling portion of said processing operation.

10. An apparatus according to claim 7 wherein said closure means includes an elongated slot in said cylindrical shell, and a gate which is secured in pressure-tight engagement over said slot during the processing operation, and wherein said feeding and discharging means includes means for moving elongated rows of containers transversely through said slot during the feeding and discharging operation.

11. An apparatus according to claim 7 wherein said closure means includes a feed valve secured to one of said end walls; and wherein said feed means includes a feed conveyor disposed within said chamber and having one end adjacent said feed valve, an input conveyor disposed entirely outside of said housing when said feed valve is closed, means for opening said feed valve, means for projecting a portion of said infeed conveyor through said feed valve in overlapping relation with said feed conveyor when said feed valve is open, means for driving said feed conveyor and said input conveyor in a direction which will move containers through said feed valve and into said chamber into position to be deflected into said carriers, and means for deflecting rows of containers into said carriers.

12. An apparatus according to claim 11 wherein said feed valve is a gate valve.

13. An apparatus according to claim 11 wherein said feed conveyor is defined by a pair of spaced parallel endless chains, and wherein said input conveyor is defined by a single endless chain having one end movable between the spaced chains of said feed conveyor when said feed valve is opened.

14. An apparatus according to claim 11 wherein said closure means includes a discharge valve secured to one of said end walls; and wherein said discharge means includes a discharge conveyor disposed within said chamber and having one end adjacent said discharge valve, an output conveyor disposed entirely outside of said housing when said discharge valve is closed, means for opening said discharge valve, means for projecting a portion of said output conveyor through said discharge valve in overlapping relation with said discharge conveyor when said discharge valve is open, means for driving said discharge conveyor and said output conveyor in a direction which will move processed containers received from said carriers through said discharge valve and out of said chamber.

15. An apparatus according to claim 7 wherein said closure means includes a discharge valve secured to one of said end walls; and wherein said discharge means includes a discharge conveyor disposed within said chamber and having one end adjacent said discharge valve, an output conveyor disposed entirely outside of said housing when said discharge valve is closed, means for opening said discharge valve, means for projecting a portion of said output conveyor through said discharge valve in overlapping relation with said discharge conveyor when said discharge valve is open, means for driving said discharge conveyor and said output conveyor in a direction which will move processed containers received from said carriers through said discharge valve and out of said chamber.

16. A heat treatment apparatus for processing products sealed in containers comprising; housing means defining a processing chamber including a generally cylindrical shell and end walls; closure means defining at least one sealable passageway into said chamber for accommodating movement of rows of containers into and out of said chamber when open and for maintaining a superatmospheric pressure within said chamber when closed; an endless processing conveyor in said chamber, a plurality of spaced articulated carriers on said conveyor for accommodating rows of containers; said closure means including a feed valve secured to one of said end walls; and feed and discharge means including a feed conveyor disposed within said chamber and having one end adjacent said feed valve, an input conveyor disposed entirely outside of said housing when said feed valve is closed, means for opening said feed valve, means for projecting a portion of said infeed conveyor through said feed valve in overlapping relation with said feed conveyor when said feed valve is opened, means for driving said feed conveyor and said input conveyor in a direction which will move containers through said feed valve into said chamber into position to be deflected into said carriers, and means for deflecting rows of containers into said carriers.

17. An apparatus according to claim 16 wherein said closure means includes a discharge valve secured to one of said end walls; and wherein said feed and discharge means includes a discharge conveyor disposed within said chamber and having one end adjacent said discharge valve, an output conveyor disposed entirely outside of said housing when said discharge valve is closed, means for opening said discharge valve, means for projecting a portion of said output conveyor through said discharge valve in overlapping relation with said discharge conveyor when said discharge valve is open, means for driving said discharge conveyor and said output conveyor in a direction which will move processed containers received from said carriers through said discharge valve and out of said chamber.

18. A heat treatment apparatus for processing products sealed in containers comprising, housing means defining a processing chamber including a shell and end walls, an endless looped processing conveyor in said chamber, a plurality of spaced articulating carriers on said conveyor for accommodating rows of containers, guide means in said chamber for guiding said conveyor around a tortuous path which includes a plurality of substantially semicylindrical looped portions, a plurality of pairs of sprockets included in said guide means, means for driving said plurality of pairs of sprockets, means for feeding rows of containers into said chamber and carriers and for discharging rows of containers from said carriers and chamber, and means for directing a heat treatment medium into said housing.

19. A heat treatment apparatus for processing products sealed in containers comprising, a cylindrical housing defining a closed treatment chamber, a plurality of pairs of matching sprockets mounted for rotation on opposite ends of said chamber, said pairs of sprockets being in the upper half of said chamber, an endless conveyor passing around all of said sprockets, said conveyor being looped downwardly into the bottom half of said chamber forming generally semicylindrical loops running between sprockets it passes around, a plurality of pairs of substantially concentric arcuate guides for supporting certain of said loops in overlying relationship with other loops, carrier means on said conveyor for carrying containers, and means for driving each of said sprockets.

20. The apparatus of claim 19, comprising guide means at a center portion of said chamber for forming a sinuous loop between sprockets.

PO-1050
(5/69)

UNITED STATES PATENT OFFICE
CERTIFICATE OF CORRECTION

Patent No. 3,613,551      Dated October 19, 1971

Inventor(s)   JAMES L. REIMERS

It is certified that error appears in the above-identified patent and that said Letters Patent are hereby corrected as shown below:

Abstract, line 3;  change "carries" to --carriers--.

Column 1, line 8;  change "3,510,310" to --3,510,320--.

Column 8, line 72;  change "3" to --1--.

Column 9, line 1;  change "1" to --3--.

Column 9, line 70;  change "11" to --7--.

Column 10, line 9;  change "7" to --11--.

Signed and sealed this 29th day of August 1972.

(SEAL)
Attest:

EDWARD M. FLETCHER, JR.
Attesting Officer

ROBERT GOTTSCHALK
Commissioner of Patents